United States Patent [19]
Hoshi et al.

[11] Patent Number: 5,150,210
[45] Date of Patent: Sep. 22, 1992

[54] IMAGE SIGNAL RESTORING APPARATUS

[75] Inventors: Hidenori Hoshi; Keiichi Fukuzawa; Yoshiki Ishii, all of Kanagawa, Japan

[73] Assignee: Canon Kabushiki Kaisha, Tokyo, Japan

[21] Appl. No.: 801,625

[22] Filed: Dec. 3, 1991

Related U.S. Application Data

[63] Continuation of Ser. No. 759,867, Sep. 16, 1991, abandoned, which is a continuation of Ser. No. 454,168, Dec. 21, 1989, abandoned.

[30] Foreign Application Priority Data

Dec. 26, 1988 [JP] Japan ................................. 63-326288
Dec. 26, 1988 [JP] Japan ................................. 63-326290

[51] Int. Cl.$^5$ .......................... H04N 7/12; H04N 7/18
[52] U.S. Cl. .................................... 358/135; 358/136; 358/105
[58] Field of Search ................. 358/105, 133, 135, 136

[56] References Cited

U.S. PATENT DOCUMENTS

| | | | |
|---|---|---|---|
| 4,700,232 | 10/1987 | Abt et al. | 358/136 |
| 4,760,446 | 7/1988 | Ninomiya et al. | 358/136 |
| 4,862,264 | 8/1989 | Wells et al. | 358/105 |
| 4,891,699 | 1/1990 | Hamada et al. | 358/105 |

Primary Examiner—John K. Peng
Attorney, Agent, or Firm—Robin, Blecker, Daley & Driscoll

[57] ABSTRACT

An apparatus for restoring an original image signal from a transmitted image information signal formed by dividing one picture amount of image signal composed of a plurality of picture element signals into a plurality of blocks each composed of a plurality of picture element signals and high-efficiently coding, for every block, the plurality of picture element signals constituting a respective one of the plurality of divided blocks is arranged to judge whether the picture element signals in each block are restorable or not on the basis of the inputted image information signal, to detect the presence or absence of motion in an image represented by the picture element signals of a block in which the picture element signals have been judged not to be unrestorable, to select either the picture element signals of a block belonging to the same picture as the unrestorable picture element signal block or the picture element signals of a block belonging to another picture according to a result of detection, and to output the selected picture element signals as interpolation picture element signals. The arrangement enables the apparatus to carry out an interpolation process in a manner most opposite to the state of the image to be reproduced.

8 Claims, 6 Drawing Sheets

| sync | ID | min | max | d1 | d2 | d3 | d4 | d5 | d6 | d7 | d8 | d9 |

FIG.4

| $B_{i-1, j-1}$ | $B_{i, j-1}$ | $B_{i+1, j-1}$ |
|---|---|---|
| $B_{i-1, j}$ | $B_{i, j}$ | $B_{i+1, j}$ |
| $B_{i-1, j+1}$ | $B_{i, j+1}$ | $B_{i+1, j+1}$ |

FIG.5

IMAGE SIGNAL RESTORING APPARATUS

This is a continuation of Ser. No. 759,867, filed Sept. 16, 1991, now abandoned, which is a continuation of Ser. No. 454,168, filed Dec. 21, 1989, now abandoned.

BACKGROUND OF THE INVENTION

1. Field of the Invention

This invention relates to an image signal restoring apparatus for restoring a digitized image signal.

2. Description of the Related Art

The image signal restoring apparatuses of the kind arranged to restore a digitized image signal include, for example, an apparatus arranged as shown in FIG. 1 of the accompanying drawings.

FIG. 1 shows in outline the arrangement of the conventional image signal reproducing apparatus for reproducing a digital image signal from a recording medium on which digitized image signals are recorded. Referring to FIG. 1, a reproduced signal obtained from a recording medium which is, for example, a video tape, is applied from an input terminal 1 to a data reproducing circuit 2. The data reproducing circuit 2 detects a synchronizing code included in the reproduced signal and reproduces all data in accordance with a clock signal synchronized with the synchronizing code. The data reproduced by the data reproducing circuit 2 is applied to an error correcting circuit (hereinafter referred to as ECC) 3. The ECC 3 corrects any code error in a known manner. After error correction, the data is supplied to a data separation circuit 4. The data separation circuit 4 separates address data which is included in the reproduced data to supply the address data to a memory control circuit 6. Meanwhile, image data included in the reproduced data is supplied to a frame memory 5.

The memory control circuit 6 causes image data to be written into the frame memory 5 in accordance with the address data separated. An error flag which corresponds to each image data is supplied from the ECC 3 to the memory control circuit 6. The error flag is supplied for the purpose of preventing any image data that cannot be corrected by the ECC 3 from being written into the frame memory 5. In other words, the memory control circuit 6 is arranged to generate writing addresses according to the address data received from the data separation circuit 4 and to generate a writing-enable signal according to the error flag supplied from ECC 4.

Reading from the frame memory 5 is performed in a predetermined order in a frame cycle. As a result, a reproduced digital image signal is obtained from a terminal 7. The image data obtained for any picture element for which an error has occurred is not written into the frame memory 5. Therefore, the image data which has been obtained for a preceding frame and stored at a frame memory address corresponding to the picture element having the error is read out. Address data are arranged for addresses corresponding to the positions of picture elements on the picture. Therefore, the image data of any picture element at which an error has (incorrigibly) occurred is eventually replaced with the image data previously obtained for a picture element located in the same position on the preceding picture (or frame). In other words, inter-frame interpolation is carried out by the arrangement described.

Meanwhile, a so-called block encoding method has recently been proposed for a high-efficient coding process. The method is based on the fact that picture elements have a high degree of correlativity among them within a picture element block consisting of (n×m) number of picture element matrixes, n and m being integers not less than 2. In accordance with this method, the high-efficient coding process is performed on such picture element blocks one by one. One example of the block encoding method has been disclosed in Japanese Laid-Open Patent Application No. SHO 62-151090. In this case, the maximum and minimum values of all the picture elements within each picture element block are obtained and each of the picture elements is quantized into quantized data between the maximum and minimum values. This is a highly efficient encoding method and has a great advantage in that the propagation of any error is limited to the inside of the block in which it occurred.

However, in reproducing the image data encoded by the block encoding method from a recording medium, reproduction by blocks often becomes impossible, because: It becomes impossible to restore all the picture elements within each block when any error takes place in the data of the above-stated maximum and minimum values or in the address data indicating the position of the block on the picture. This inevitably results in a wider unrestorable area on the picture.

Therefore, if the interpolating process is performed with the reproducing apparatus of FIG. 1 in reproducing the block-encoded image data from the recording medium, it is highly possible that the image data for one and the same area on the picture might remain unreproduced over an excessively long period of time. This would deteriorate the picture quality. The picture quality deterioration due to this would more frequently occur particularly in cases where the reproducing operation is to be performed at a speed different from a speed employed in recording.

FIG. 2 shows in outline the arrangement of an image signal restoring apparatus which is arranged to reproduce and restore image data from a recording medium on which the image data is recorded in a state of having been block-encoded in the above-stated manner. Referring to FIG. 2, an input terminal 8 is arranged to receive a reproduced signal including image data which has been encoded by blocks. An error detecting circuit 13 is arranged to detect data errors in accordance with an error detection code included in the reproduced signal received. A decoding circuit 9 is arranged to decode the encoded data coming from the input terminal 8 and to produce, along with the image data, the address of the decoded block of the data, i.e., a block address, which is, for example, a signal indicating the position of the block on the picture. In this instance, data to be decoded by using any data that is detected to have an error by the above-stated error detecting circuit 13 is converted into a given code before it is output. The image data output from the decoding circuit 9 is written into a frame memory 10 in accordance with an applicable block address. A preceding-frame memory 16 is arranged to store image data of a frame preceding a frame for which the image data is stored in the frame memory 10. The data stored in these frame memories 10 and 16 are read out in accordance with reading addresses generated by a reading address generating circuit 17. The stored data is thus output in a predetermined sequence.

An error judging circuit 14 examines the output of the frame memory 10 to find any picture element which has been replaced with the above-stated given code thus indicating occurrence of an error. When the image data of this picture element is supplied to a switch 15, the connecting position of the switch 15 is shifted by the error judging circuit 14 to one of its two sides which is on the output side of the preceding-frame memory 16. The position of the switch 15 is normally on the output side of the frame memory 10. With the switch position shifted as mentioned above, any image data that is omitted due to occurrence of an error is thus replaced with image data located in the same position on the picture of a frame immediately preceding the current frame. The substitute image data is supplied to an output terminal 18. The preceding-frame memory 16 is arranged to have its contents renewed with apposite image data coming from the output side of the switch 15.

Since the dropped-out image data is to be replaced with the corresponding image data of the preceding frame, the image data for the picture is unevenly and variedly renewed. Therefore, in accordance with the above-stated example of conventional arrangement, new image data and old image data are commingled to give an unnatural reproduced image. In the event of a special reproducing operation wherein incoming image data is in an eccentric state, this problem becomes more salient.

SUMMARY OF THE INVENTION

It is a general object of this invention to provide an image signal restoring apparatus which is capable of solving the above-stated problems.

It is a more specific object of the invention to provide an image signal restoring apparatus which is capable of minimizing picture quality deterioration.

Under this object, an image signal restoring apparatus arranged according to this invention to restore an original image signal from a transmitted image information signal comprises: judgment means, to which an image information signal formed by dividing one picture amount of image signal composed of a plurality of picture element signals into a plurality of blocks each composed of a plurality of picture element signals and by high-efficiently coding, for every block, the plurality of picture element signals constituting a respective one of the plurality of divided blocks is inputted for every block, for judging whether the picture element signals in each block are restorable or not on the basis of the inputted image information signal; motion detecting means for detecting presence or absence of motion in an image represented by the picture element signals of a block in which the picture element signals have been judged not to be unrestorable by the judgment means; and interpolation means for selecting either the picture element signals of a block belonging to the same picture as that of the block in which the picture element signals have been judged to be unrestorable by the judgment means or the picture element signals of a block belonging to a picture different from that of the block in which the picture element signals have been judged to be unrestorable, according to a result of detection made by the motion detecting means, and for outputting the selected picture element signals as interpolation picture element signals.

It is another object of the invention to provide an image signal restoring apparatus which is capable of giving a restored image with a stable, fine picture quality by carrying out an interpolating process in an optimum manner according to the condition of the image.

An image signal restoring apparatus arranged according to this invention to restore an original image signal from a transmitted image information signal comprises: judgment means, to which an image information signal formed by dividing one picture amount of image signal composed of a plurality of picture element signals into a plurality of blocks each composed of a plurality of picture element signals and by high-efficiently coding, for every block, the plurality of picture element signals constituting a respective one of the plurality of divided blocks is inputted for every block, for judging whether the picture element signals in each block are restorable or not on the basis of the inputted image information signal; motion detecting means for detecting presence or absence of motion in an image represented by the picture element signals of a block in which the picture element signals have been judged not to be unrestorable by the judgment means; detection result storing means for storing a result of detection made by the motion detecting means; and interpolation means for selecting either the picture element signals of a block belonging to the same picture as that of the block in which the picture element signals have been judged to be unrestorable by the judgment means or the picture element signals of a block belonging to a picture different from that of the block in which the picture element signals have been judged to be unrestorable, according to the result of detection stored by the storing means, and for outputting the selected picture element signals as interpolation picture element signals.

The above and other objects and features of this invention will become apparent from the following detailed description of embodiments thereof taken in connection with the accompanying drawings.

BRIEF DESCRIPTION OF THE DRAWINGS

FIG. 4 shows a data format for one block amount of data to be reproduced by the reproducing apparatus shown in FIG. 3.

FIG. 5 shows the operation of an interpolating circuit included in FIG. 3.

DETAILED DESCRIPTION OF THE PREFERRED EMBODIMENTS

The following describes this invention through embodiments thereof.

Figure 1:
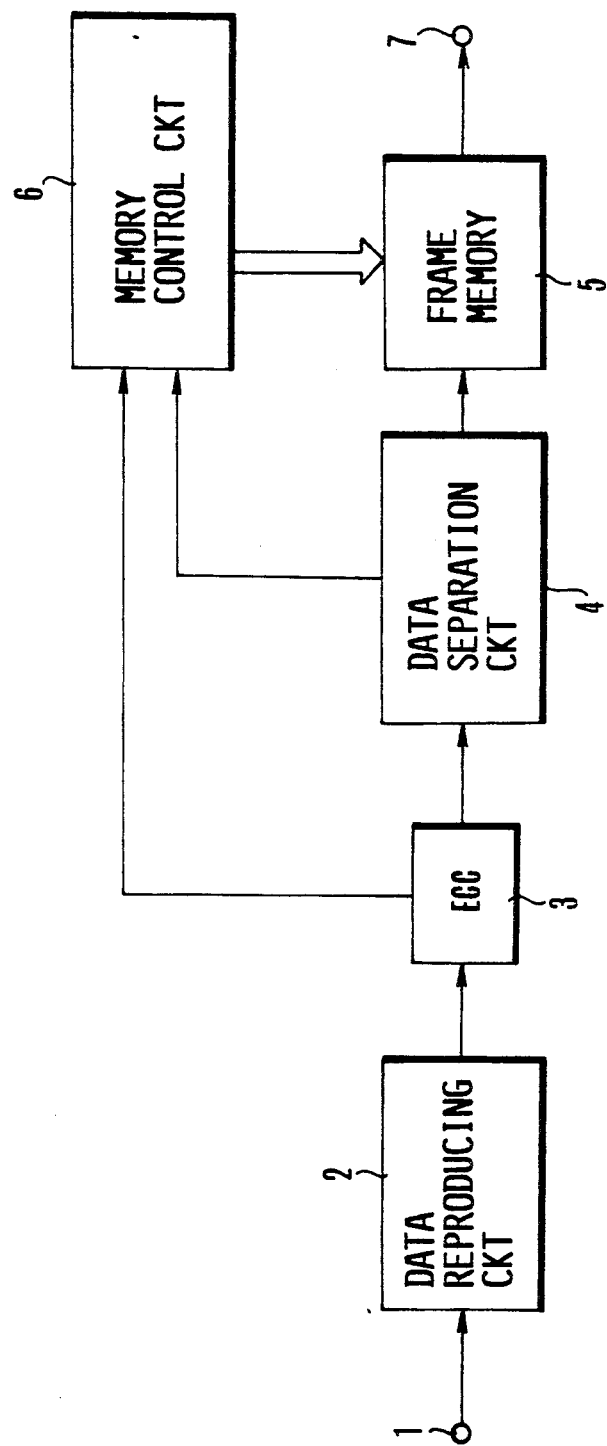
FIG. 1 shows in outline the arrangement of the conventional image signal reproducing apparatus for reproducing and restoring a digital image signal from a recording medium on which a image signal is recorded in a digitized state.
Figure 3:
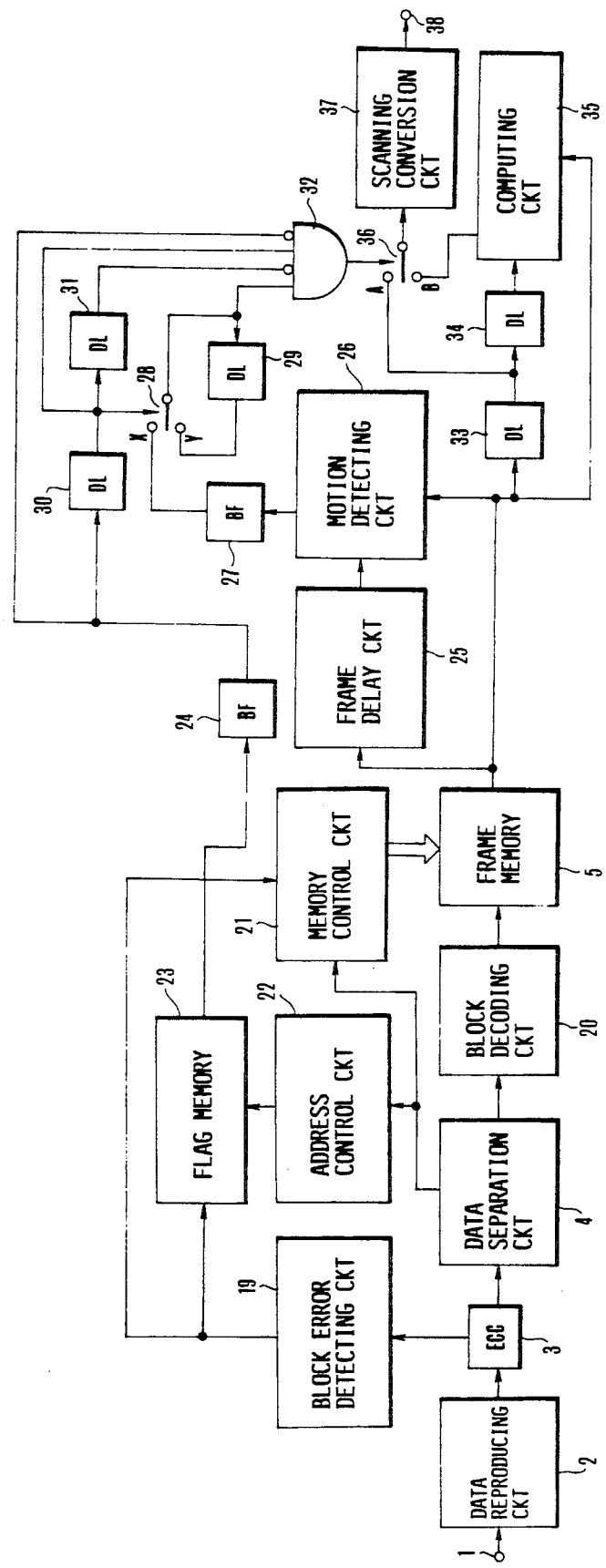
FIG. 3 is a block diagram showing the arrangement of a reproducing apparatus to which this invention is applied as a first embodiment thereof.

FIG. 3 shows in a block diagram the arrangement of a reproducing apparatus to which this invention is applied as a first embodiment thereof. In FIG. 3, the same component elements as those of FIG. 1 are indicated by the same reference numerals. A reference numeral 19 denotes a block error detecting circuit which generates a block error flag indicating a judgment as to whether or not each of picture element blocks is restorable on the basis of an error flag output from an ECC circuit 3. A data format for each block of picture elements to be reproduced by the reproducing apparatus according to this invention is as shown in FIG. 4. In FIG. 4, the illustration includes a synchronizing code "sync"; an added code "ID" which includes block address data; a minimum value "min"; a maximum value "max"; quantized codes d1 to d9 for picture elements. In a case where the error flag output from the ECC circuit 3 is attached to any of the codes "ID", "min" and "max", the block error detecting circuit 19 produces a block error flag indicating that the block is unreproducible.

A data separation circuit 4 is arranged to receive data from the ECC circuit 3 and to supply the block address data included in the code ID to a memory control circuit 21 and image data to a block decoding circuit 20 respectively. The block decoding circuit 20 is arranged to produce decoded picture element data for every block. The memory control circuit 21 is arranged to determine the writing address of a frame memory 5 for writing the decoded picture element data of each picture element block on the basis of the block address data received from the data separation circuit 4. In addition to this, the memory control circuit 21 determines, according to the block error flag output from the block error detecting circuit 19, whether the decoded picture element data of the corresponding block is to be written into the frame memory 5.

The image of each frame is read out by blocks from the frame memory 5 in the order of raster scanning. At this time, any picture element block that has been found to be unrestorable is not stored in the frame memory 5. In that event, restored picture element data for a previous picture is output in place of the unrestorable picture element block.

Further, the block error flag output from the block error detecting circuit 19 is supplied also to a flag memory 23. An address control circuit 22 is arranged to determine a writing address for writing the block error flag into the flag memory 23 in accordance with the block address data output from the data separation circuit 4. The block error flags stored in the flag memory 23 are read out in accordance with the sequence in which the contents of the frame memory 5 are read out. The timing of reading from the flag memory 23 is adjusted by means of a buffer (BF) 24 to the timing of the data read out from the frame memory 5.

A frame delay circuit 25 is arranged to delay for one frame period the picture element data output from the frame memory 5. A motion detecting circuit 26 is arranged to obtain a difference between the picture element data output from the frame delay circuit 25 and the picture element data output from the frame memory 5. Difference values thus obtained are summed up for every block. Any block that has the difference sum below a given value is considered to have no motion. The motion detecting circuit 26 then produces a low level ("0") output for such blocks having no motion. If the difference sum of any block is above the given value, that block is considered to have a motion and a high level ("1") output is produced. This high level output of the circuit 26 is hereinafter called "block motion data". The timing of the block motion data is adjusted by means of a buffer (BF) 27 to the picture element block output from a delay circuit (DL) 33.

FIG. 5 shows the operation of an interpolating circuit of this embodiment. In FIG. 5, each of reference symbols "Bi-1,j-1" to "Bi+1,j+1" denotes one block of picture elements. The arrangement of the picture element blocks illustrated represents the allocation of these blocks on each picture plane. These blocks are arranged and the delay time of the delay circuits (DLs) 33 and 34 is set as follows: Assuming that the picture element block Bi,J+1 is currently output from the frame memory 5, the picture element data of the block Bi,j and that of the block Bi,j-1 are output from the DLs 33 and 34, assuming all such blocks not to be unrestorable and thus to have been stored in frame memory 5. Further, in this instance, the delay time of delay circuits (DLs) 30 and 31 is arranged as follows: While the BF 24 outputs the block error flag for the picture element block Bi,j+1, the DLs 30 and 31 produce block error flags for the picture element blocks Bi,j and Bi,j-1. Further, the delay time of another delay circuit (DL) 29 is set as follows: In this instance, while the BF 27 outputs the block motion data of the picture element block Bi,j, the DL 29 produces the block motion data of the picture element block Bi,j-1.

The picture element data output from the DL 33 is supplied to the terminal A of a switch 36. Then, an average value of the picture element data output from the DL 34 and the picture element data output from the frame memory 5 is obtained by a computing circuit 35. Therefore, when the picture element data of the picture element block Bi,j would have been, were it restorable and stored in frame memory 5, supplied to the terminal A of the switch 36, the average value of the picture element data of the block Bi,j-1 and that of the block Bi,j+1 is supplied to the other terminal B of the switch 36. In other words, if the picture element block Bi,j is unreproducible, intra-frame interpolation can be accomplished with the average value of the picture element data of the block Bi,j-1 and that of the block Bi,j+1 by connecting the switch 36 to its terminal B while the whole picture element data of the picture element block Bi,j would, if restorable and stored in frame memory 5, have been output from the DL 33.

The switch 36 is arranged to be controlled in the following manner: An AND gate 32 is arranged to produce a high level output under that condition that the output of the BF 24 is at "0", the output of the DL 30 at "1" (in this instance, the switch 28 is connected to the side Y), the output of the DL 31 at "0" and the output of a switch 28 at "1". With the high level output from the AND gate 32, the connecting position of the switch 36 is shifted to the terminal B. The intra-frame interpolation is performed for the picture element block Bi,j only when this block Bi,j is unreproducible and both the picture element blocks Bi,j-1 and Bi,j+1 are reproducible while no occurrence of motion is found in the blocks Bi,j-1 and Bi,j+1.

However, since the block motion data is not trustworthy in a case where the picture element block Bi,j is unreproducible, block motion data for another picture element block Bi,j-1 is output from the switch 28 by shifting the connecting position of the switch 28 to one side Y thereof when the output of the DL 30 is at "1".

If the picture element blocks Bi,j-1 and Bi,j+1 are reproducible while the picture element block Bi,j is unreproducible and no occurrence of motion is found in the blocks Bi,j-1 and Bi,j+1, the intra-frame interpolation can be adequately carried out for the block Bi,j by using the upper and lower blocks Bi,j-1 and Bi,j+1.

Further, in a case where inspection of adjacent picture element blocks yields indication of motion therein and accordingly an unrestorable block therebetween would have motion inter-frame interpolation can be accomplished in a very natural manner by using a picture element block which is included in the preceding picture in the same position as the unreproducible block. The arrangement of the embodiment described thus enables an interpolating action to be carried out in the best suited manner irrespectively of the presence or absence of motion and the number of unreproducible blocks. The output of the switch 36 which is obtained in this manner is converted into a raster scanning signal by a scanning conversion circuit 37 before it is output from an output terminal 38.

In the case of the embodiment described above, the intra-frame interpolation is performed with a picture element block having the average value of the upper and lower picture element blocks. As for inter-frame interpolation, a picture element block located in the same position on the preceding picture is used as it exists. However, this invention is not limited to this method. In accordance with the invention, different intra-frame and inter-frame interpolating methods may be adaptively employed.

As apparent from the foregoing description, this embodiment is capable of always most appositely interpolating picture element blocks according to the presence and absence of motion in the image and minimizes deterioration of a reproduced image due to interpolation.

Figure 2:
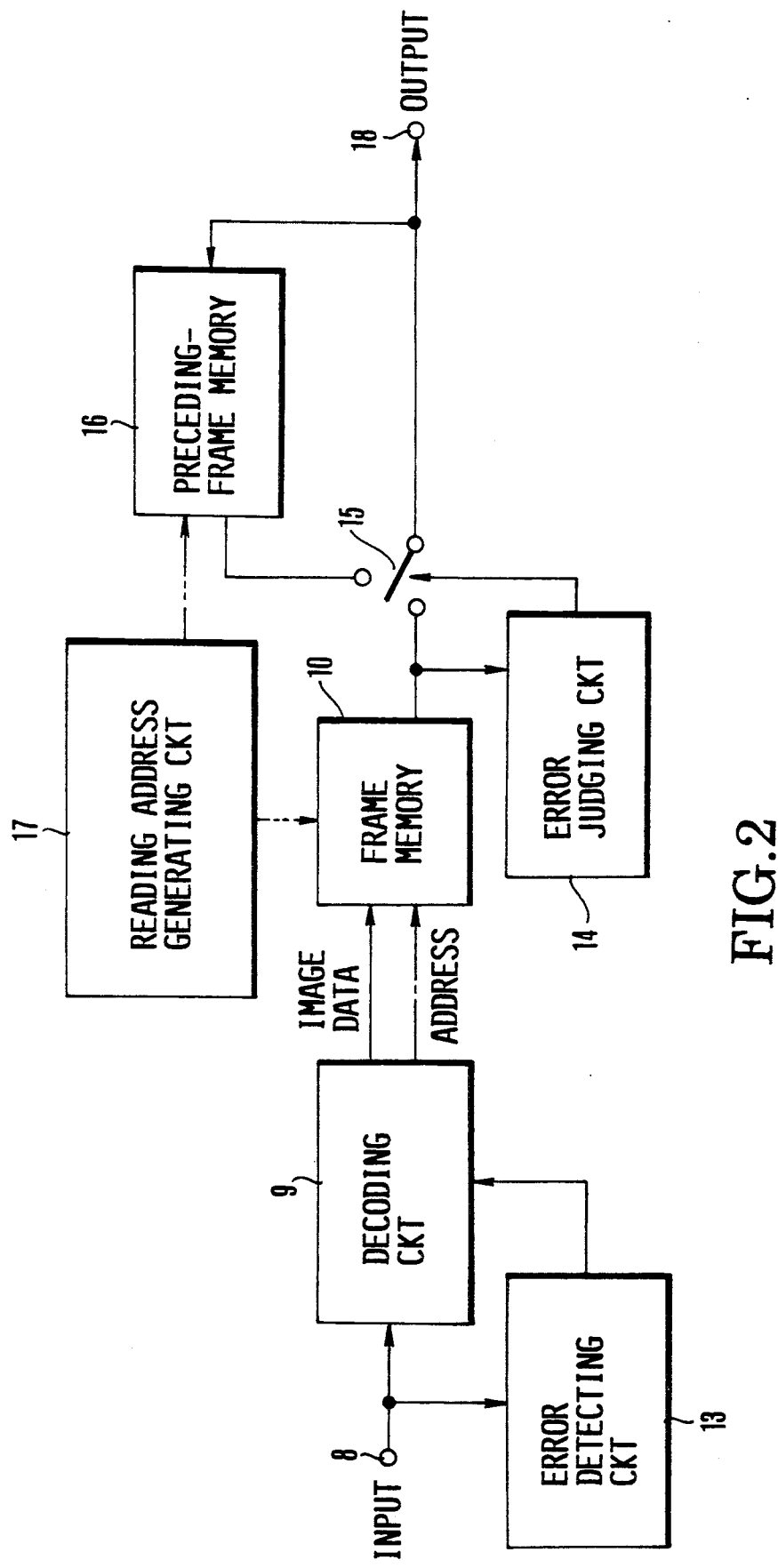
FIG. 2 shows in outline the arrangement of the conventional image signal reproducing apparatus for reproducing and restoring image data from a recording medium on which a image data is recorded in a block-encoded state.
Figure 6:
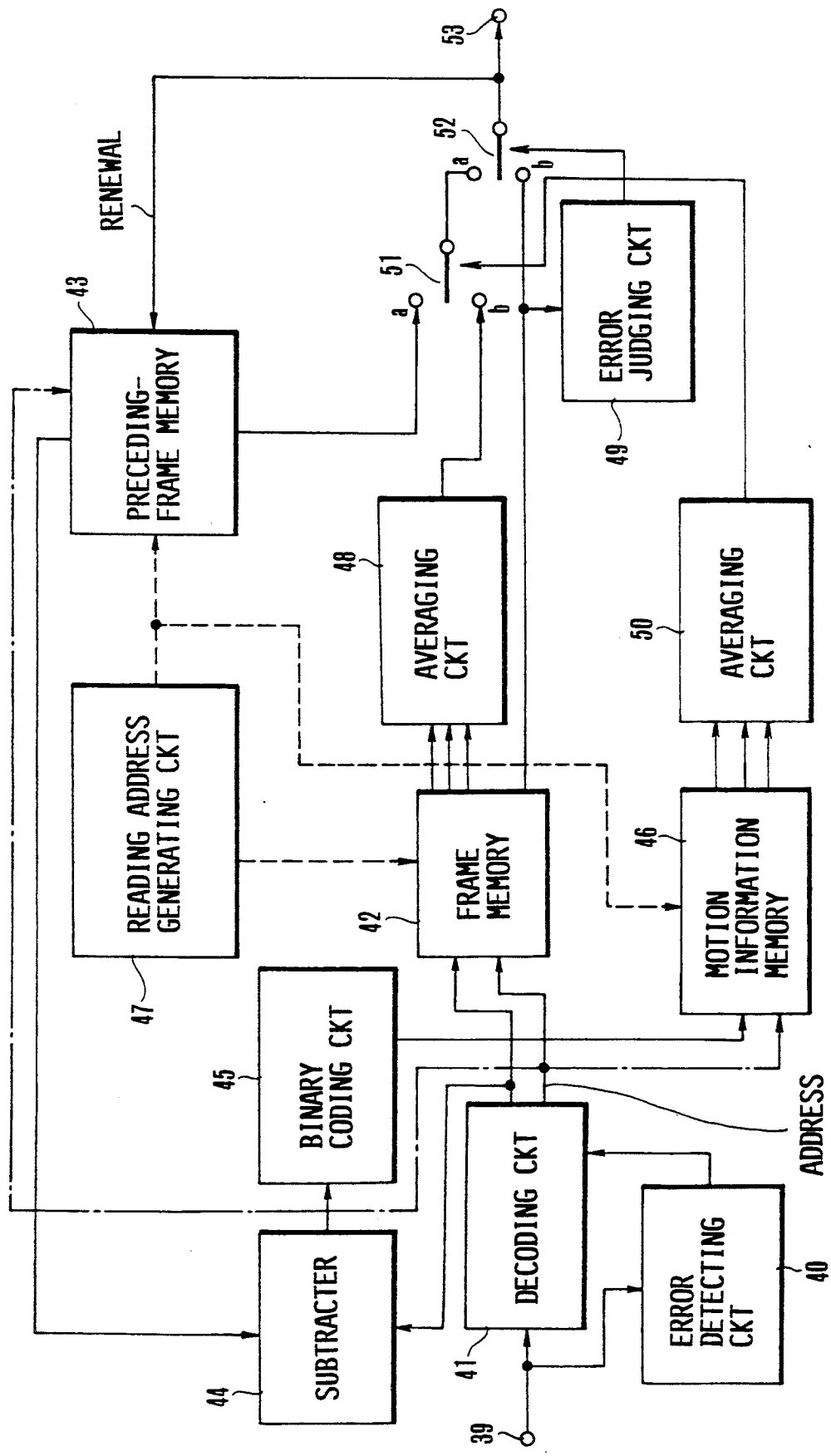
FIG. 6 is a block diagram showing a reproducing apparatus to which this invention is applied as a second embodiment thereof.

A second embodiment of the invention is arranged as described below with reference to the drawings:

FIG. 6 is a block diagram showing the arrangement of a reproducing apparatus to which this invention is applied as the second embodiment thereof. In FIG. 6, such component parts that are provided for ordinary reproduction wherein a drop-out block seldom occurs are omitted from the illustration. An input terminal 39 is arranged to receive block-encoded image data. An error detecting circuit 40 is arranged in the same manner as the error detecting circuit 13 of FIG. 2. A decoding circuit 41 is similar to the decoding circuit 9 of FIG. 2. A frame memory 42 is arranged to be capable of concurrently producing the image data of the block of a designated address with those of a plurality of blocks located in the neighborhood of the designated block. A preceding-frame memory 43 is arranged to store decoded image data of a frame immediately preceding the current frame. A subtracter 44 is arranged to obtain a difference between the decoded image data of the current frame and that of the preceding frame. A binary coding circuit 45 is arranged to sum up the inter-frame difference values by blocks; to binary-code the sum thus-obtained with a given threshold value; and to form a motion information signal for every block indicating whether the block has any image motion. A motion information memory 46 is arranged to store the output of the binary coding circuit 45. A reading address generating circuit 47 is arranged to generate a reading address signal for reading data from the frame memory 42. An averaging circuit 48 is arranged to average image data of a plurality of blocks located near the block of the designated address. Another averaging circuit 50 is arranged to average information on the motion taking place within these blocks located near the block of the designated address. A switch 51 is arranged to have its connecting position changed by the output of the averaging circuit 50. A reference numeral 53 denotes an output terminal.

An input signal supplied to the input terminal 39 is decoded at the decoding circuit 41 by using the output of the error detecting circuit 40 in the same manner as in the case of the conventional apparatus. The decoded input signal is serially written into the frame memory 42. Concurrently with the writing action on the frame memory 42, image data of the same position on the picture plane of the immediately preceding frame is read out from the preceding-frame memory 43. Then, a difference in data between the current and preceding frames is obtained at the subtracter 44. The output of the subtracter 44 is supplied to the binary coding circuit 45. The circuit 45 sums up the inter-frame difference value by blocks and compares the difference value of each block with a given threshold value. Each block is then judged to have any image motion or no motion according to the result of comparison. The result of judgment is then output as motion information. The motion information is written into the motion information memory 46 in accordance with the address signal output from the decoding circuit 41. Through these processes, the image data is stored in the frame memory 42 while the information on motion of image data which is determined by blocks is stored in the motion information memory 46.

Next, reading from the frame memory 42 is as follows: The reading address generating circuit 47 generates reading addresses designating one after another the blocks which form one frame. The frame memory 42 then outputs the image data of the block designated by the address and also the image data of a plurality of blocks located near the designated block. The averaging circuit 48 averages the image data of these nearby blocks. In other words, intra-frame interpolating data is obtained by the averaging circuit 48. The output of the averaging circuit 48 is supplied to the contact "b" of the switch 51. The reading address signal output from the address generating circuit 47 is supplied also to the motion information memory 46 and the preceding-frame memory 43. The motion information memory 46 outputs motion information on the nearby blocks located near the block designated by the reading address. The preceding-frame memory 43 outputs the decoded image data of the frame immediately preceding the current frame to the contact "a" of the switch 51. The averaging circuit 50 averages the outputs of the motion information memory 46 to obtain intra-frame interpolating data for the motion information. The switch 51 operates under the control of the output of the averaging circuit 50.

An error judging circuit 49 examines the image data of the block of the designated address of the frame memory 42 to find any erroneous picture element which has been replaced with the above-stated given code. As a result of this, the circuit 49 produces a block error flag indicating for each block whether the block is in error or not. In the process of judgment, any block that has a number of erroneous picture elements more than a given number is judged to be an erroneous block. When the image data of an erroneous block is supplied to error judging circuit 49 and is so adjusted to be in error is connected to the other terminal "a" thereof by circuit 49. Although it is not shown, the data inputs to the terminals "a" and "b" of the switch 52 are arranged to have been delayed by some suitable means such as buffers or the like for a period of time corresponding to the processing time required by the error judging circuit 49.

The image data of an erroneous block is thus replaced with interpolating data supplied from the switch 51. At that time, the motion information for the designated address of the motion information memory 46 is not trustworthy as it has been obtained by using the image data of the erroneous block. However, the interpolating value of the motion information obtained by binary-coding the output of the averaging circuit 50 nearly corresponds to the information on the erroneous block. Therefore, intra-frame interpolating data or inter-frame interpolating data is adequately obtainable from the switch 51 by virtue of the interpolating value.

The output of the switch 52 is supplied to the output terminal 53 and also to the preceding-frame memory 43 for renewal of the data stored therein.

The provision of the motion information memory 46 thus enables the second embodiment to interpolate the dropped-out block part with the benefit of motion information. Therefore, a recorded image can be stably reproduced, because any image area having an image motion is accurately discriminated from other areas having no image motion for each block.

In the case of the second embodiment shown in FIG. 6, the motion information on an erroneous block (a dropped-out block) is arranged to be obtained by averaging information on motion of other blocks located near the erroneous block. This arrangement may be changed to have motion information which is obtained for a frame immediately preceding the current frame stored in a memory and to have motion information for any erroneous block replaced or interpolated with the stored motion information of a block located in the same position on the picture of the preceding frame.

Figure 7:
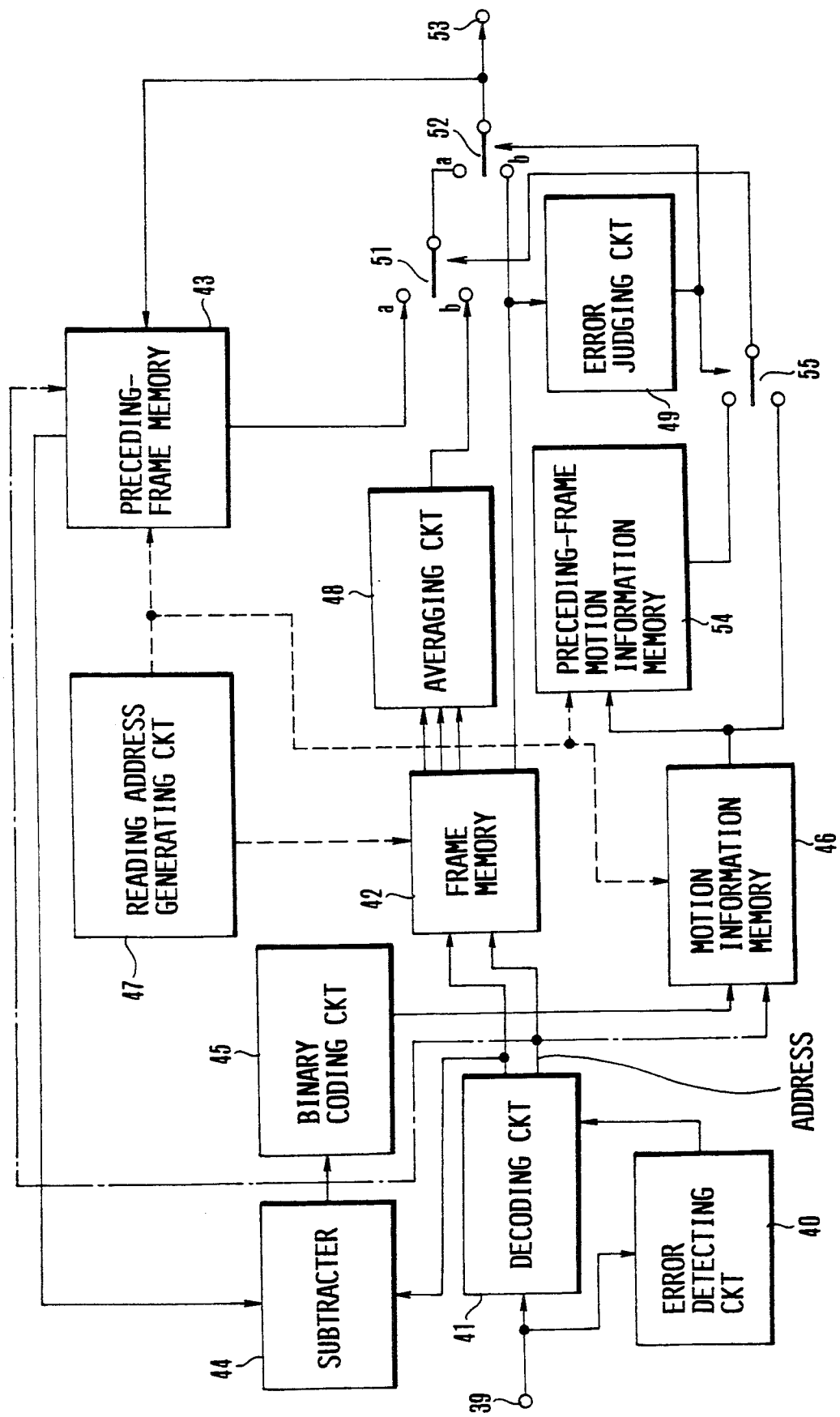
FIG. 7 is a block diagram showing by way of example a modification of the reproducing apparatus of FIG. 6.

An example of this modification of the second embodiment is arranged as shown in a block diagram in FIG. 7, wherein the same component parts as those of FIG. 6 are indicated by the same reference numerals. Referring to FIG. 7, a preceding-frame motion information memory 54 is arranged to store information about the motion of a preceding frame. For a dropped-out block, the connecting position of a switch 55 is shifted to one side thereof which is connected to the preceding-frame motion information memory 54. By this, the switch 51 is controlled by the information on the motion of a block located in the same position on the picture of the preceding frame stored in the preceding-frame motion information memory 54. The contents of the preceding-frame motion information memory 54 are of course renewed after the end of every frame by using the contents of the motion information memory 46.

In the embodiment described above, the motion information is arranged to indicate the presence or absence of any image motion by blocks. In accordance with this invention, however, the unit of determining an image motion is not limited to this. The image motion indicating information may be differently formed in a different manner from the embodiment described.

As apparent from the foregoing description, the embodiment is arranged to change the interpolating data from one kind over to another according to the motion information. Therefore, a recorded image can be adequately reproduced according to the nature of the image. Particularly, in the event of a special reproduction whereby the image data is obtained only in part, the invented interpolating method which utilizes a correlation between frames enables the reproducing apparatus to give a reproduced image of a fine and stable picture quality.

What is claimed is:

1. An image signal restoring apparatus for restoring an original image signal from a transmitted image information signal, comprising:

a) judgment means, to which an image information signal formed by dividing one picture amount of image signal composed of a plurality of picture element signals into a plurality of blocks each composed of a plurality of picture element signals and by block coding, for every block, the plurality of picture element signals constituting a respective one of the plurality of blocks is inputted for every block, for judging whether the picture element signals in each block are restorable or not on the basis of the inputted image information signal;

b) motion detecting means for detecting presence or absence of motion in an image represented by the picture element signals of a block in which the picture element signals have been judged to be restorable by said judgment means; and c) interpolation means for selecting either the picture element signals of a block belonging to the same picture as that of the block in which the picture element signals have been judged to be not restorable by said judgment means or the picture element signals of a block belonging to a picture different from that of the block in which the picture element signals have been judged to be not restorable, according to a result of detection made by said motion detecting means, and for outputting the selected picture element signals as interpolation picture element signals.

2. An apparatus according to claim 1, wherein said motion detecting means includes:

a) picture element signal storing means for storing picture element signals already restored;

b) motion detecting information signal generating means arranged to compare newly restored picture element signals with the picture element signals stored by said picture element signal storing means and to generate, according to a result of comparison, a motion detecting information signal indicative of the presence or absence of motion in an image represented by the picture element signals; and c) motion detecting information signal outputting means arranged to temporarily store motion detecting information signals generated by said motion detecting information signal generating means and, for a block in which the picture element signals have been judged to be not restorable by said judgment means, to form and output another motion detecting information signal by using the motion detecting information signal which is for a block in which the picture element signals have been judged to be restorable among the stored motion detecting information signals.

3. An image signal restoring apparatus for restoring an original image signal from a transmitted image information signal, comprising:

a) judgment means, to which an image information signal formed by dividing one picture amount of image signal composed of a plurality of picture element signals into a plurality of blocks each composed of a plurality of picture element signals and by block coding, for every block, the plurality of picture element signals constituting a respective one of the plurality of blocks is inputted for every block, for judging whether the picture element signals in each block are restorable or not on the basis of the inputted image information signal;

b) motion detecting means detecting presence or absence of motion in an image represented by the picture element signals of a block in which the picture element signals have been judged to be restorable by said judgment means; and c) detection result storing means for storing a result of detection made by said motion detecting means; and d) interpolation means for selecting either the picture element signals of a block belonging to the same picture as that of the block in which the picture element signals have been judged to be not restorable by said judgment means or the picture element signals of a block belonging to a picture different from that of the block in which the picture element signals have been judged to be not restorable, according to a result of detection stored by said detection result storing means, and for outputting the selected picture element signals as interpolation picture element signals.

4. An apparatus according to claim 3, wherein said motion detecting means includes:

a) picture element signal storing means for storing picture element signals already restored; and b) motion detecting information signal generating means arranged to compare newly restored picture element signals with the picture element signals stored by said picture element signal storing means and to generate, according to a result of comparison, a motion detection information signal indicative of the presence or absence of motion in an image represented by the picture element signals.

5. An apparatus according to claim 4, wherein said detection result storing means includes:

a) first storing means for storing a motion detecting information signal for each of blocks of the picture element signals already restored;

b) second storing means for storing a motion detecting information signal for each of blocks of the newly restored picture element signals; and c) motion detecting information signal outputting means for outputting a motion detecting information signal which, among motion detecting information signals stored by said first storing means, corresponds to a block in which the picture element signals have been judged to be not restorable by said judgment means.

6. An image signal restoring apparatus for restoring an original image signal from a transmitted image information signal, comprising:

(a) judgment means to which an image information signal formed by dividing one picture amount of image signal composed of a plurality of picture element signals into a plurality of blocks each composed of a plurality of picture element signals and by block coding, for every block, the plurality of picture element signals constituting a respective one of the plurality of blocks is inputted for every block, for judging whether original picture element signals are restorable or not on the basis of the inputted image information signal in each block; and (b) interpolation means for interpolating the picture element signals of a block in which the original picture element signals have been judged to be not restorable by said judgment means, with picture element signals of another block.

7. An apparatus according to claim 6, wherein said interpolation means is arranged to select, as the picture element signals in which the original picture element signals of a block which have been judged to be not restorable by said judgment means, either the picture element signals of another block corresponding to the same picture as that of said not restorable block or the picture elements signals of another block corresponding to a picture which is different from said not restorable block and to output the selected picture element signals as interpolation picture element signals.

8. An apparatus according to claim 6, further comprising:

motion detecting means for detecting presence or absence of a motion in an image corresponding to the block in which the original picture element signals have been judged to be not restorable;

in which said interpolation means is arranged to select, as the picture element signals in which the original picture element signals of a block which have been judged to be not restorable by said judgment means, either picture element signals of another block corresponding to the same picture as that of said not restorable block or the picture element signals of another block corresponding to a picture which is different from said not restorable block, in accordance with a result of detection made by said motion detecting means, and to output the selected picture element, as interpolation picture element signals.

* * * * *

UNITED STATES PATENT AND TRADEMARK OFFICE
CERTIFICATE OF CORRECTION

PATENT NO. : 5,150,210
DATED : September 22, 1992
INVENTOR(S) : Hidenori Hoshi and Keiichi Fukuzawa and Yoshiki Ishii It is certified that error appears in the above-identified patent and that said Letters Patent is hereby corrected as shown below:

Abstract, item [57], line 22, change, "opposite" to --apposite--

Col. 4, line 35.  Change "the" to -- a --
Col. 4, line 38.  Change "a" to -- the --
Col. 4, line 40.  Change "the" to -- a --
Col. 4, line 43.  Change "a" to -- the --
Col. 7, line 4.   After "motion" insert -- , --
Col. 8, line 64.  Change "adjusted" to -- adjudged -- and after "error" insert --,the switch 52 --

Signed and Sealed this

Twenty-sixth Day of October, 1993

BRUCE LEHMAN

*Attest:*

*Attesting Officer*   Commissioner of Patents and Trademarks